United States Patent [19]

Barnes et al.

[11] 4,355,698
[45] Oct. 26, 1982

[54] BRAKE AND TRANSMISSION CONTROL

[75] Inventors: Charles A. Barnes, Bellevue; Dean E. Davis, Battle Creek; Carl L. Wykoff, Jackson, all of Mich.

[73] Assignee: Clark Equipment Company, Buchanan, Mich.

[21] Appl. No.: 170,360

[22] Filed: Jul. 21, 1980

[51] Int. Cl.³ ............................................... B60T 7/02
[52] U.S. Cl. ..................................... 180/273; 188/109; 192/4 A; 303/19
[58] Field of Search ............... 180/272, 271, 273, 322; 188/109; 192/4 A, 7; 303/19

[56] References Cited

U.S. PATENT DOCUMENTS

| | | | |
|---|---|---|---|
| 2,377,303 | 6/1945 | Acton | 180/273 |
| 2,931,454 | 4/1960 | Schuster | 180/273 |
| 3,265,150 | 8/1966 | Westman | 180/273 |
| 3,332,522 | 7/1967 | Dence | 188/109 |
| 3,334,488 | 8/1967 | Lauck | 180/273 X |
| 3,700,062 | 10/1972 | Garnett | 180/273 |
| 3,788,431 | 1/1974 | York | 180/273 X |
| 3,972,398 | 8/1976 | Chamberlain | 192/4 A |
| 3,978,946 | 9/1976 | Ream | 192/4 A |
| 4,004,665 | 1/1977 | Guhl et al. | 192/4 A |
| 4,019,602 | 4/1977 | Habiger | 180/273 |
| 4,136,752 | 1/1979 | Friesen et al. | 180/273 |

*Primary Examiner*—Joseph F. Peters, Jr.
*Assistant Examiner*—Michael Mar
*Attorney, Agent, or Firm*—Kenneth C. Witt

[57] ABSTRACT

A brake and transmission control system for a vehicle having a hydraulically controlled power shift transmission and a spring applied hydraulically released parking brake. Both the transmission control and the brake are interconnected hydraulically with the operator's seat whereby when the operator leaves the seat the transmission is automatically shifted to neutral and the parking brake is automatically applied.

4 Claims, 3 Drawing Figures

4,355,698

BRAKE AND TRANSMISSION CONTROL

BACKGROUND OF THE INVENTION

1. Field of the Invention

This invention relates to a spring applied, fluid pressure released brake for a vehicle, and to the coordination of such a brake with the control valve for a power shift transmission.

2. Description of the Prior Art

Brake mechanisms are known in which the brake is applied by the force of a spring, and in which, in order to release the brake, fluid pressure is used to overcome the force of the spring. For example, U.S. Pat. No. 3,332,522 discloses a system utilizing such a brake mechanism as the parking brake of a fork lift truck. The brake is controlled by the position of the operator's seat. When the operator is on the seat fluid pressure is applied to keep the brake released. When the operator leaves the seat a spring raises it and closes a valve which cuts off hydraulic pressure to the brake actuator and allows the spring to apply the brake.

It is known also to deactivate a power shift transmission in a vehicle by cutting off hydraulic pressure to the control valve of the transmission when the operator leaves his seat on the vehicle, and U.S. Pat. No. 2,931,454 shows such a mechanism. However, when the operator again resumes his position on the seat without manually shifting the transmission control valve to neutral the transmission will again be activated which may result in sudden and unexpected movement of the vehicle.

U.S. Pat. No. 3,265,150 shows a construction proposed for overcoming the undesirable feature of the preceding patent, such construction comprising a mechanical lost motion connection between the operator's seat of the vehicle and the operating lever of the transmission control valve for moving such lever to the neutral position whenever the seat is vacated by the operator. U.S. Pat. No. 3,700,062 shows a similar arrangement except the lost motion connection is in the linkage between the transmission operating lever and the transmission control valve.

SUMMARY OF THE INVENTION

A brake and transmission control system for a vehicle having a spring applied hydraulically released brake and a hydraulically shifted transmission. The control valve for the transmission has an operating position and a neutral position, and is biased to the neutral position. A hydraulically actuated detent is arranged to hold the control valve in the operating position when it is energized. Both the hydraulically released brake and the hydraulically actuated detent are energized from a source of pressurized fluid when the operator is on the seat which maintains a seat operated valve open. When the operator leaves the seat and the seat operated valve closes the brake is applied and the transmission control valve is shifted to neutral.

DESCRIPTION OF THE PREFERRED EMBODIMENT

Figure 1:
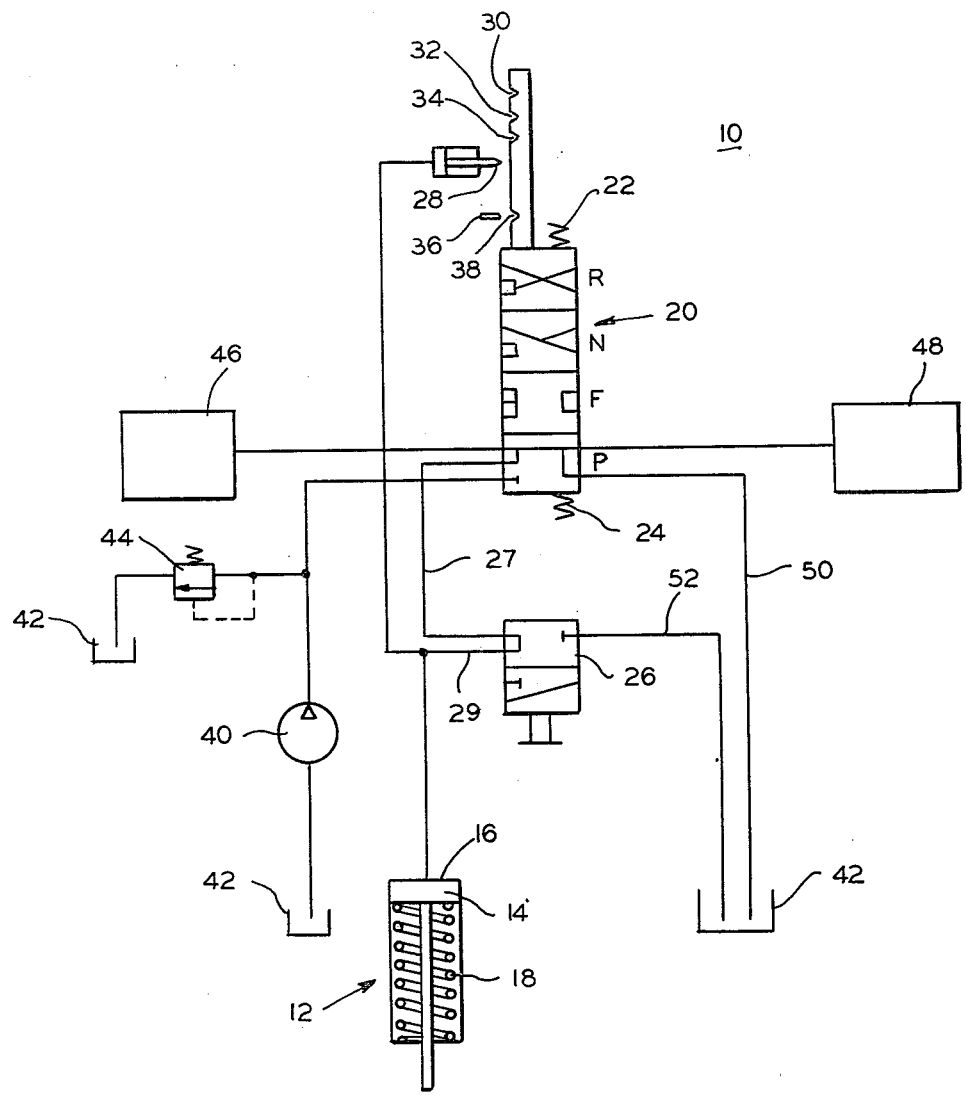
FIG. 1 of the drawing is a schematic diagram showing the invention in one condition.

The brake and transmission control system according to the present invention is indicated generally by the numeral 10 in all figures of the drawing. The vehicle in which this system is used has a spring applied hydraulically released parking brake, and the numeral 12 in the drawing designates the actuator for such brake which includes a hydraulically operated piston 14 in a cylinder or chamber 16 and a spring 18 which moves the piston 14 to apply the brake in the absence of pressure in chamber 16. The vehicle also includes a power shift transmission having a hydraulic control valve 20 which as shown has two operating positions plus a neutral position and a park position. These are designated in the drawing by R for reverse, N for neutral, F for forward and P for park. The transmission control valve 20 is biased to the neutral position and this is indicated diagrammatically by the springs 22 and 24.

The system includes a three-way two-position valve 26 which is operated by movement of the operator's seat (not shown). Valve 26 is in the position indicated in FIG. 1 which is the operating position, when the seat is occupied. When the seat is not occupied valve 26 moves to the other position which as explained later is a drain position. A hydraulically energized detent 28 is provided to releasably hold the transmission control valve 20 in forward, reverse or neutral when the detent is energized. It will be appreciated that this detent can be overcome by the vehicle operator operating the transmission control valve in the normal manner to move it between any of its four positions. As indicated diagrammatically detent 28 cooperates with notches 30, 32 and 34 respectively when the valve 20 is in the reverse, neutral or forward positions. Also provided is a mechanical detent 36 to releasably hold the control valve in the park position in cooperation with notch 38.

Pressurized hydraulic fluid is provided to the system by a pump 40 which draws the fluid reservoir 42. A pressure regulator valve 44 is provided to maintain the desired operating pressure for the system. The pump 40 provides pressurized hydraulic fluid for the operation of a forward clutch 46 or a reverse clutch 48 under control of the control valve 20. However, in the position shown in FIG. 1, the park position, the pump 40 is cut off from the remainder of the system and neither of the clutches is operative.

Figure 2:
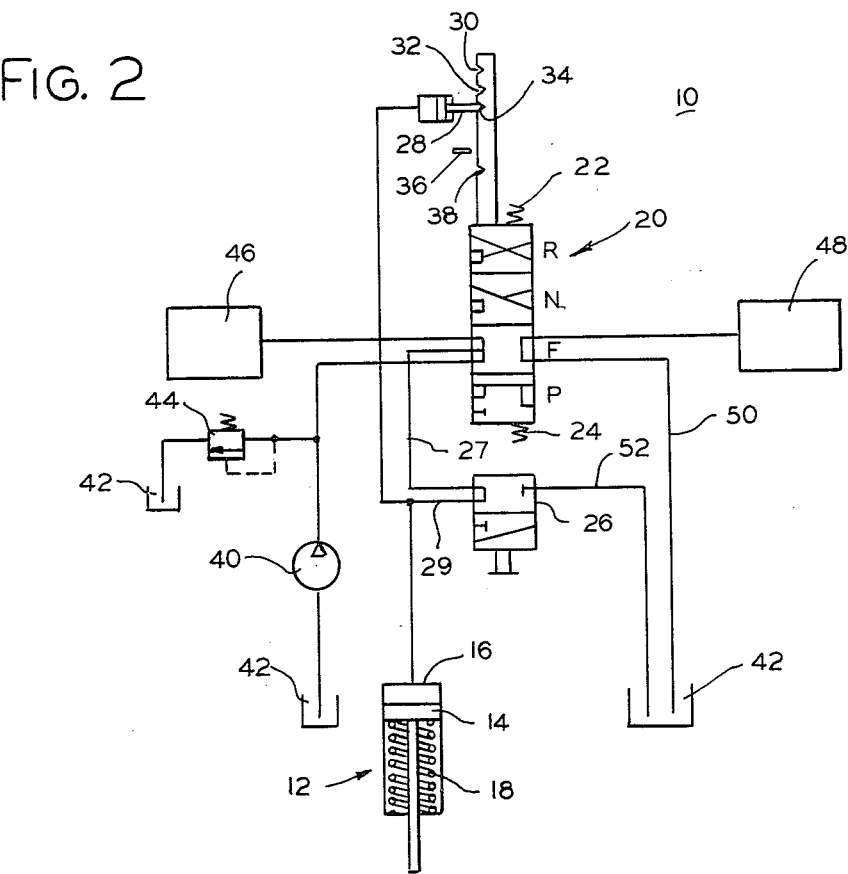
FIG. 2 is the same diagram showing the invention in a second condition.
Figure 3:
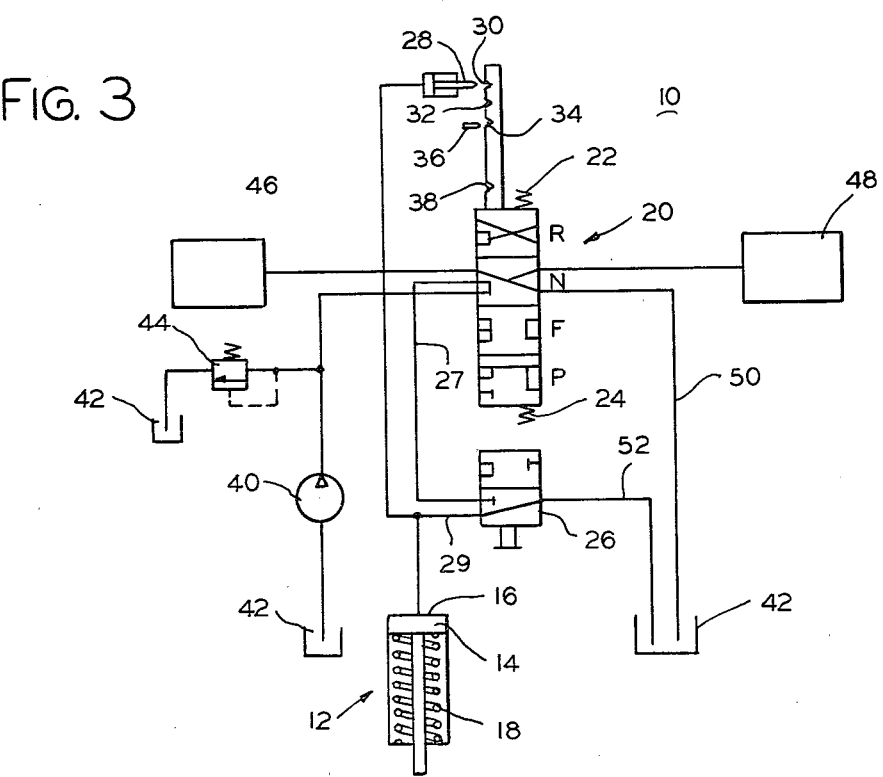
FIG. 3 is the same diagram showing a third condition.

Valve 20 is a five-way four-position valve and in the park position of FIG. 1 both transmission clutches 46 and 48 are deenergized being connected to drain line 50 which leads back to the reservoir. In the park position actuator 12 also is connected to the drain line 50 by valve 20 by way of valve 26 which is in the position indicated in FIG. 1 when the operator's seat is occupied. When valve 20 is moved to the forward position as shown in FIG. 2 both the actuator 12 and the detent 28 are connected to be energized from pump 40 through intervening valve 26 and interconnecting conduits including 27 and 29. Energizing actuator 12 releases the brake while energizing detent 28 causes the detent to engage notch 34 and releasably hold the transmission control valve in the forward position. If the vehicle operator then stops the vehicle and leaves his seat, valve 26 is moved to the drain position which connects both actuator 12 and detent 28 to drain conduit 52. Denergizing actuator 12 causes the brake to be applied while deenergizing detent 28 releases the control valve to be moved to the neutral position by biasing spring 22, and this condition is illustrated in FIG. 3 of the drawing.

It will be understood that the engine of the vehicle may continue running while the parking brake is on and the transmission control is in neutral. However, when the operator wishes to resume operation and resumes his seat to restore valve 26 to its operating position he must also manually move the transmission control valve from the neutral position to one of the operating positions, that is, forward or reverse, before the vehicle will move. When the operator moves the transmission control valve to or through the neutral position during normal operation without leaving his seat the brake is not applied, but if he should leave the seat for any reason when it is automatically applied.

If he puts the transmission control valve in park, as shown in FIG. 1, then the brake is automatically applied even though he remains on the seat, because in the park position actuator 12 is connected to the drain line 50 by valve 20 by way of valve 26 which is in the position indicated in FIG. 1 of the drawing when the operator's seat is occupied.

While we have illustrated and described herein the best mode contemplated for carrying out our invention it will be appreciated that modifications may be made. Accordingly, it should be understood that we intend to cover by the appended claims all such modifications which fall within the true spirit and scope of our invention.

We claim:

1. A brake and transmission control system for a vehicle having a spring applied fluid pressure released brake, a fluid pressure controlled transmission including a control valve with a neutral position and at least one operating position and biased to the neutral position, and a source of pressurized fluid, comprising
   a two position valve having an operating position and a drain position,
   a fluid pressure actuated detent arranged to hold the control valve in the operating position when energized, and
   conduit means connecting both said brake and said detent to be energized from said source when said two position valve is in the operating position and when said two position valve is then moved to its drain position said detent is deenergized causing said control valve to move from the operating position to the neutral position and remain there until it is moved manually.

2. A system as in claim 1 in which said transmission control valve has a park position which disconnects said brake from said source.

3. A system as in claim 1 in which the vehicle has an operator's seat interconnected with said two position valve, said two position valve being in the operating position when the seat is occupied and in the drain position when the seat is not occupied.

4. In a vehicle having a spring applied fluid pressure released parking brake, a power shift transmission including fluid pressure actuated forward and reverse clutches, a pump for supplying pressurized fluid for the transmission, a control valve for the transmission including, forward, reverse, neutral and park positions and biased to the neutral position, and an operator's seat, a brake and transmission control system comprising
   a two position valve connected to the operator's seat and having an operating position and a drain position,
   said two position valve being in the operating position when the operator's seat is occupied and in the drain position when the operator's seat is unoccupied,
   a fluid pressure actuated detent arranged when energized to hold the control valve in the forward, neutral or reverse position,
   a mechanical detent arranged to releasably hold the control valve in the park position, and
   conduit means connecting said brake and said fluid pressure actuated detent to be energized jointly from said pump when the operator's seat is occupied and said two position valve is in the operating position.

* * * * *